United States Patent
Lee (10) Patent No.: US 9,720,452 B2
(45) Date of Patent: Aug. 1, 2017

(54) KICKSTAND FOR A PORTABLE COMPUTING DEVICE

(71) Applicant: HEWLETT-PACKARD DEVELOPMENT COMPANY, L.P., Houston, TX (US)

(72) Inventor: Chien-Kuo (Frank) Lee, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/904,612

(22) PCT Filed: Aug. 22, 2013

(86) PCT No.: PCT/US2013/056115
§ 371 (c)(1),
(2) Date: Jan. 12, 2016

(87) PCT Pub. No.: WO2016/085439
PCT Pub. Date: Jun. 2, 2016

(65) Prior Publication Data
US 2016/0216742 A1    Jul. 28, 2016

(51) Int. Cl.
*G06F 1/16*    (2006.01)
*F16M 11/38*    (2006.01)

(52) U.S. Cl.
CPC .......... *G06F 1/1679* (2013.01); *F16M 11/38* (2013.01); *G06F 1/166* (2013.01); *G06F 1/1626* (2013.01); *G06F 1/1632* (2013.01); *G06F 1/1669* (2013.01)

(58) Field of Classification Search
CPC ...... G06F 1/1679; G06F 1/166; G06F 1/1626; G06F 1/1669; F16M 11/38
See application file for complete search history.

(56) References Cited

U.S. PATENT DOCUMENTS

| | | | |
|---|---|---|---|
| 6,856,506 B2 | 2/2005 | Doherty et al. | |
| 8,177,183 B2 | 5/2012 | Reinen | |
| 8,498,100 B1 | 7/2013 | Whitt et al. | |
| 8,605,431 B2 * | 12/2013 | Cheng | F16M 13/00 248/456 |

(Continued)

FOREIGN PATENT DOCUMENTS

| | | |
|---|---|---|
| TW | 573902 | 1/2004 |
| TW | M386730 | 8/2010 |

(Continued)

OTHER PUBLICATIONS

Buchanan, M., "Oh Yes, the First iPad Kickstand"; Jan. 28, 2010; 9 pages.

(Continued)

*Primary Examiner* — Courtney Smith
*Assistant Examiner* — Christopher L Augustin
(74) *Attorney, Agent, or Firm* — HP Patent Department (57) ABSTRACT

Examples disclosed herein provide a portable computing device with a kickstand, The portable computing device can have a display housing including a display surface and a back surface opposite the display surface. The portable computing device can have the kickstand rotatably connected to the display housing on two sidewalls of the display housing. The kickstand can support the display housing in a plurality of viewing angles.

10 Claims, 6 Drawing Sheets

(56) References Cited

U.S. PATENT DOCUMENTS

| | | | |
|---|---|---|---|
| 8,942,773 B2* | 1/2015 | Wu | A45C 11/00 206/320 |
| 2006/0028791 A1* | 2/2006 | Huang | G06F 1/1601 361/679.08 |
| 2007/0062089 A1 | 3/2007 | Homer et al. | |
| 2008/0053770 A1* | 3/2008 | Tynyk | A45C 11/00 190/100 |
| 2009/0314915 A1* | 12/2009 | Tu | F16M 11/10 248/398 |
| 2010/0142175 A1* | 6/2010 | Cheng | F16M 13/00 361/825 |
| 2012/0006950 A1 | 1/2012 | Vandiver | |
| 2012/0103921 A1* | 5/2012 | Liu | F16M 13/00 211/26 |
| 2012/0162102 A1* | 6/2012 | Cheng | F16M 11/041 345/173 |
| 2012/0215284 A1 | 8/2012 | Berg et al. | |
| 2012/0320514 A1 | 12/2012 | Franz et al. | |
| 2013/0092811 A1 | 4/2013 | Funk et al. | |
| 2013/0107437 A1* | 5/2013 | Chen | H04M 1/0214 361/679.08 |
| 2013/0163197 A1* | 6/2013 | Mack | F16M 11/00 361/679.56 |
| 2013/0229386 A1* | 9/2013 | Bathiche | G06F 1/1654 345/175 |
| 2013/0335891 A1* | 12/2013 | Chen | F16M 11/10 361/679.01 |
| 2014/0293534 A1* | 10/2014 | Siddiqui | E05D 7/00 361/679.55 |
| 2014/0376179 A1* | 12/2014 | Jenkins | G06F 1/166 361/679.55 |

FOREIGN PATENT DOCUMENTS

| | | |
|---|---|---|
| TW | 201317740 | 5/2013 |
| TW | 201318510 A | 5/2013 |

OTHER PUBLICATIONS

Elliott, M.; "Gateway One ZX6915-53 Review and Ratings"; 2010; pp. 6.

* cited by examiner

KICKSTAND FOR A PORTABLE COMPUTING DEVICE

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two housings connected together at a common end via hinges, for example. In most cases, a first or display housing is utilized to provide a viewable display to a user while a second or base housing includes an area for user input (e.g., touchpad and keyboard). In addition, the viewable display may be a touchscreen, allowing the user to interact directly with what is displayed by touching the screen with simple or multi-touch gestures.

DETAILED DESCRIPTION

Notebook computers may include a feature that allows the device to be "converted" from one style of use to another style of use. For example, a notebook computer may be converted from a laptop mode, where the touchpad and keyboard of the base housing is available to be used as input, to a tablet mode, where the display of the display housing may be used for both viewing and input. Such devices that serve this dual purpose may be called convertible laptops.

Many form factors exist for convertible laptops. A common form factor includes a display housing that is detachable from a base housing to operate the display housing in tablet mode. With the ability to operate the display housing independently from the base housing in tablet mode, a majority, if not all, of the internal components, such as electrical components, of the laptop may be assembled within the display housing. Examples of the internal components include, but are not limited to, the battery, hard drive, memory, and processor. As an example, the base housing may only contain circuitry for the touchpad and the keyboard, and circuitry for any ports to which cables/connections can be connected. As a result, the detachable display housing of a convertible laptop may weigh more than its base housing. A challenge faced by manufacturers of convertible laptops with a detachable display housing is improving the user experience when convertible laptops are operated in their various modes (e.g., laptop mode and tablet mode).

Examples disclosed herein provide a kickstand rotatably connected to a display housing of a convertible laptop. As an example, the kickstand supports the display housing at multiple viewing angles when the convertible laptop is operated in one of its various modes, such as laptop mode or tablet mode. Additionally, due to the weight of the display housing compared to the base housing, the kickstand may avoid the convertible laptop from toppling backwards when the laptop is operated in laptop mode. Incorporating the kickstand into the design of a convertible laptop with a detachable display housing may improve the user experience when the convertible laptop is operated in its various modes.

As used herein, a "kickstand" refers to a support member connected to a portable computing device for propping up the device in a plurality of viewing angles. As an example, the kickstand may be a rectangular frame that flips out or pivots from a portion of a perimeter of the device and makes contact with a surface in various positions for propping up the device at the various viewing angles. As a result, the computing device may be kept upright via the kickstand without leaning the device against another object or with the aid of a user.

In one example, a portable computing device can have a display housing including a display surface and a back surface opposite the display surface. The portable computing device can have a kickstand rotatably connected to the display housing on two sidewalls of the display housing. The kickstand can support the display housing in a plurality of viewing angles.

In another example, a portable computing device can have a display housing including a display surface and a back surface opposite the display surface, and a base housing to which the display housing is rotatably connected. The portable computing device can have a kickstand rotatably connected to the display housing on two sidewalls of the display housing. The kickstand can support the display housing in a plurality of viewing angles.

In yet another example, a kickstand for a portable computing device can have a rectangular frame rotatably connected to the portable computing device on two sidewalls of the portable computing device. The frame can support the portable computing device in a plurality of viewing angles. The kickstand can have non-skid elements disposed along a length of the rectangular frame to frictionally support the portable computing on a surface in the plurality of viewing angles.

Figures 1A, 1B:
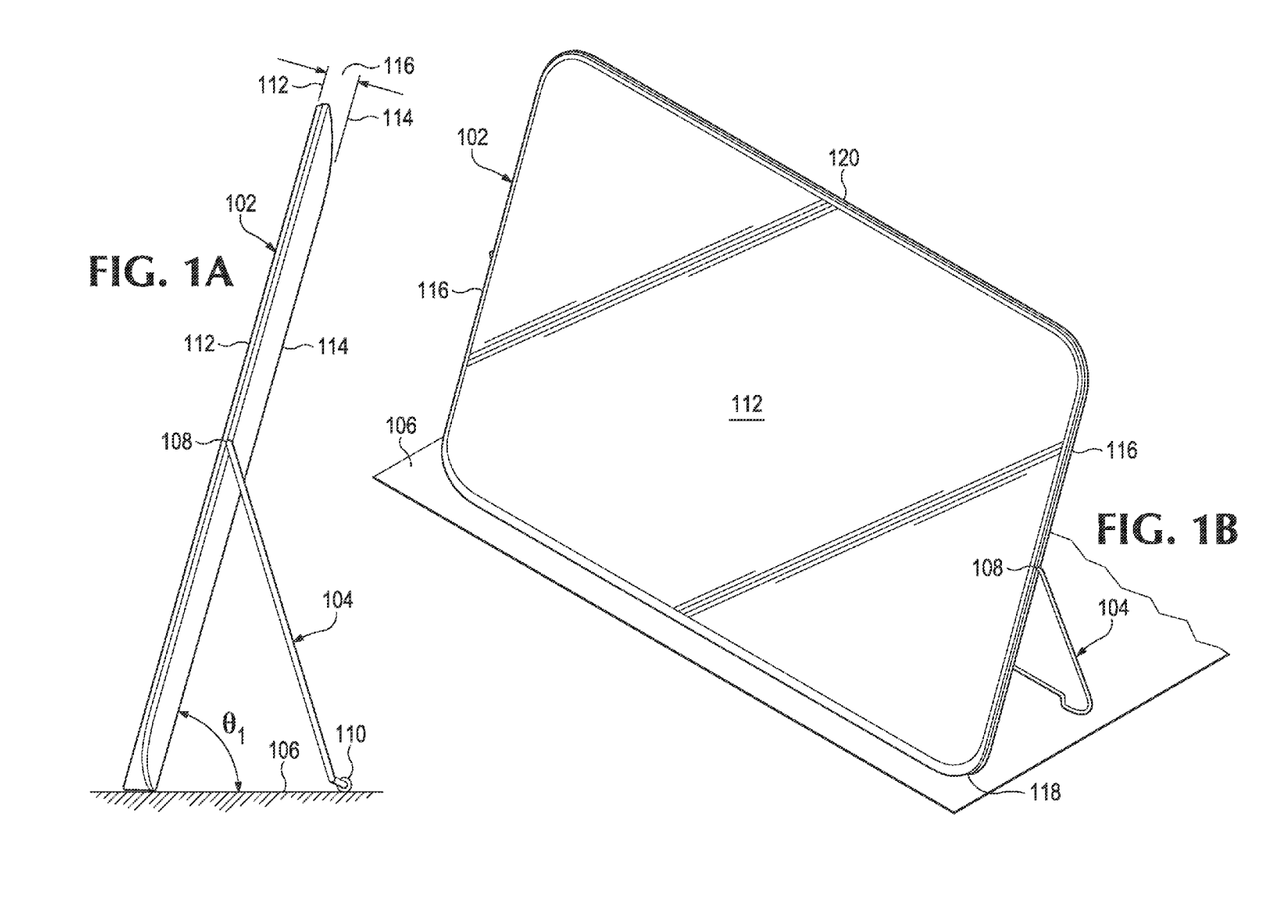
FIGS. 1A-C illustrate different views of a portable computing device propped up via a kickstand at an angle from a surface, according to an example.
Figures 1C, 2:
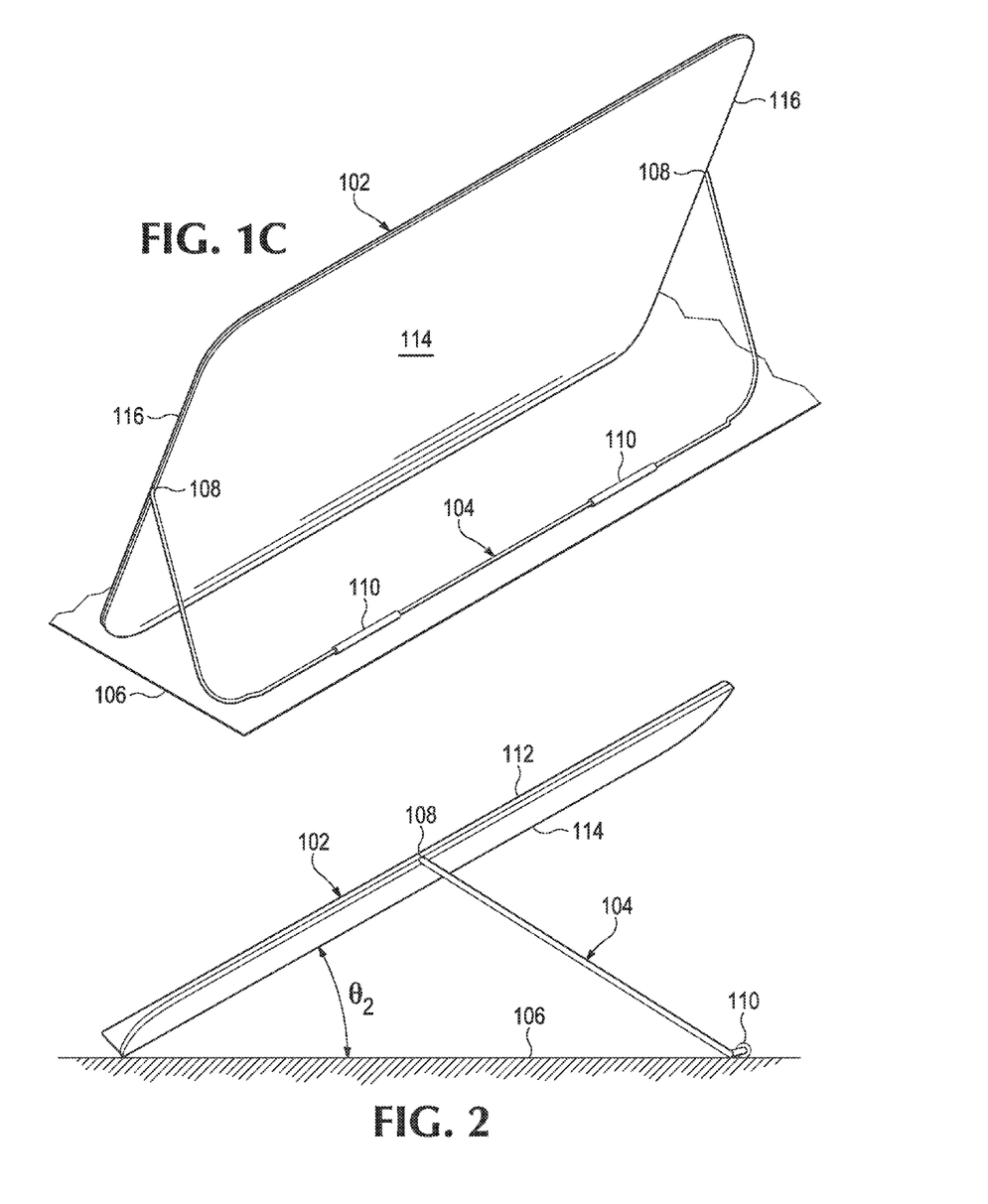
FIG. 2 illustrates a portable computing device propped up via a kickstand at a shallow angle from a surface, according to an example.

With reference to the figures, FIGS. 1A-C illustrate different views of a portable computing device 102 propped up via a kickstand 104 at an angle $\theta_1$ from a surface 106, as an example. The surface 106 may be a level surface, such as, for example, a desk or table. However, the kickstand 104 may also support the device 102 on a surface that is not level. Examples of the device 102 include, but are not limited to, a smartphone, a tablet, or a display housing of a convertible laptop. The device 102 may include a display surface 112 and a back surface 114 opposite the display surface 112. The display surface 112 may be a touchscreen, allowing a user to interact directly with what is displayed by touching the screen with simple or multi-touch gestures. Although the figures illustrate that the back surface 114 includes a convex surface, the back surface 114 may include a plurality of different surfaces, such as a flat surface. A perimeter of the device 102, in between the display surface 112 and the back surface 114, may include sidewalls 116, a bottom wall 118, and a top wall 120.

Users of the computing device 102 may desire to view the display surface 112 in a plurality of viewing angles. Rather than a user handling and using the device 102 with their hands, the user may desire to have their hands free while using the device 102, particularly when the device 102 is used for a prolonged period of time. As an example, the device 102 may include the kickstand 104 for supporting the device 102 in the plurality of viewing angles. Referring to FIG. 1B, a user may be able to view the display surface 112 of the computing device 102 at an appropriate viewing angle by adjusting the kickstand 104.

FIG. 1A illustrates a side view of the device 102, as an example. As illustrated, the kickstand 104 may be rotatably connected at 108 to the device 102 on a sidewall 116 of the device 102. Referring to FIG. 1C, the kickstand 104 may he rotatably connected at 108 on two sidewalls 116 of the device 102. Therefore, the kickstand 104 may be connected on one sidewall or two sidewalls of the device 102. For supporting the computing device 102 in the plurality of viewing angles, the kickstand may rotate freely around the back surface 114 of the device 102 via an axis at 108. As an example, in order to rotate the kickstand 104 around the back surface 114 from the bottom wall 118 to the top wall 120, the kickstand 104 may connected at a midpoint on the sidewalls 116. As illustrated in FIG. 1C, the kickstand 104 may be a rectangular frame that supports the device 102 at viewing angles appropriate for a user.

Referring to FIG, 1C, the kickstand 104 may include non-skid elements 110 for frictionally supporting the computing device 102 on the surface 106 in the plurality of viewing angles. In addition to the non-skid elements 110 on the kickstand 104, the portion of the device 102 that makes contact with the surface 106 may also include non-skid material (not illustrated) to provide further frictional support for viewing the display surface 112 at an angle that is appropriate for a user. The kickstand 104 may include a single non-skid element 110 disposed along a length of the kickstand, or multiple non-skid elements 110 as illustrated in FIG. 1C.

The non-skid elements 110 may be composed of a material, such as rubber, that provides a level of frictional resistance between the elements 110 and the surface 106 that is sufficient to allow for the display surface 112 of the device 102 to be viewed at an angle that appropriate for a user. In this manner, the kickstand 104 may be configured to selectively support the device 102 in a steep support angle position (as shown, for example, in FIG. 1A) and in a shallow support angle position (as shown, for example, in FIG. 2). For example, a steep support angle position may be useful when the user is using the display surface 112 for viewing purposes and/or when the user is seated at a desk and is viewing the display surface 112 from a lower position. A shallow support angle position, for example, may be useful when the user is using the display surface 112 for input purposes (such as, for example, when the display surface 112 is being used as a virtual keyboard) and/or when the user is standing and is viewing the display surface 112 from a higher position.

As an example, a steep support angle position may comprise an angle $\theta_1$ between the device 102 and the surface 106 that is greater than about 45 degrees (as shown, for example, in FIG. 1A), and a shallow support angle position may comprise an angle $\theta_2$ between the device 102 and the surface 106 that is less than about 45 degrees (as shown, for example, in FIG. 2). It is appreciated that the kickstand 104 may be configured to support the device 102 in other desired support angle positions.

FIGS. 3A-D illustrate different views of the kickstand 104 retracted along a portion of a perimeter of the portable computing device 102, as an example. The kickstand 104 may be retracted when a user desires to handle and use the device 102 with their hands. When retracted, the kickstand 104 may occupy a portion of a perimeter of the device 102. In addition, when retracted, the kickstand 104 may not cover the back surface 114. As an example, the back surface 114 may remain exposed when the kickstand 104 is retracted.

Figure 3A:
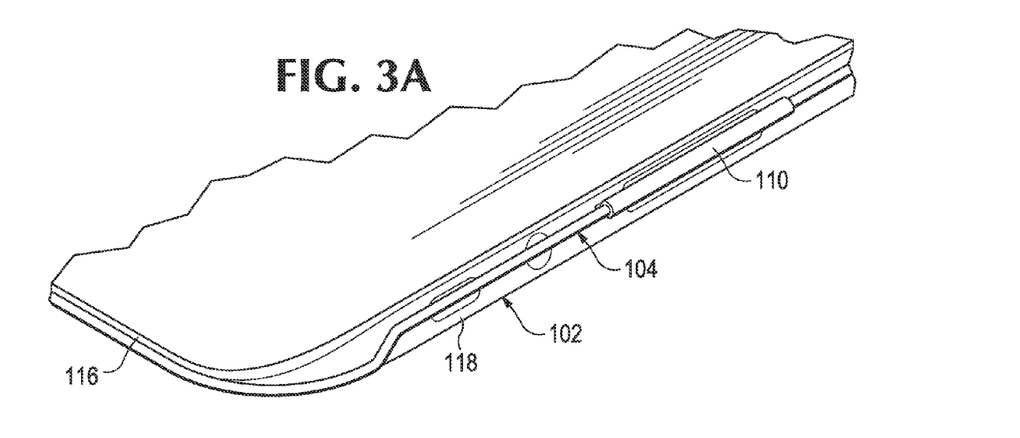
FIGS. 3A-D illustrate different views of a kickstand retracted along a portion of a perimeter of a portable computing device, according to an example.
Figure 3B:
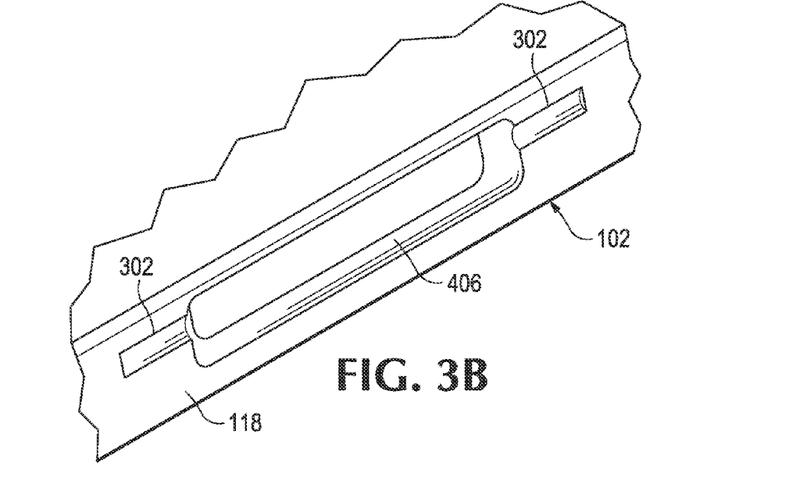
Figure 3C:
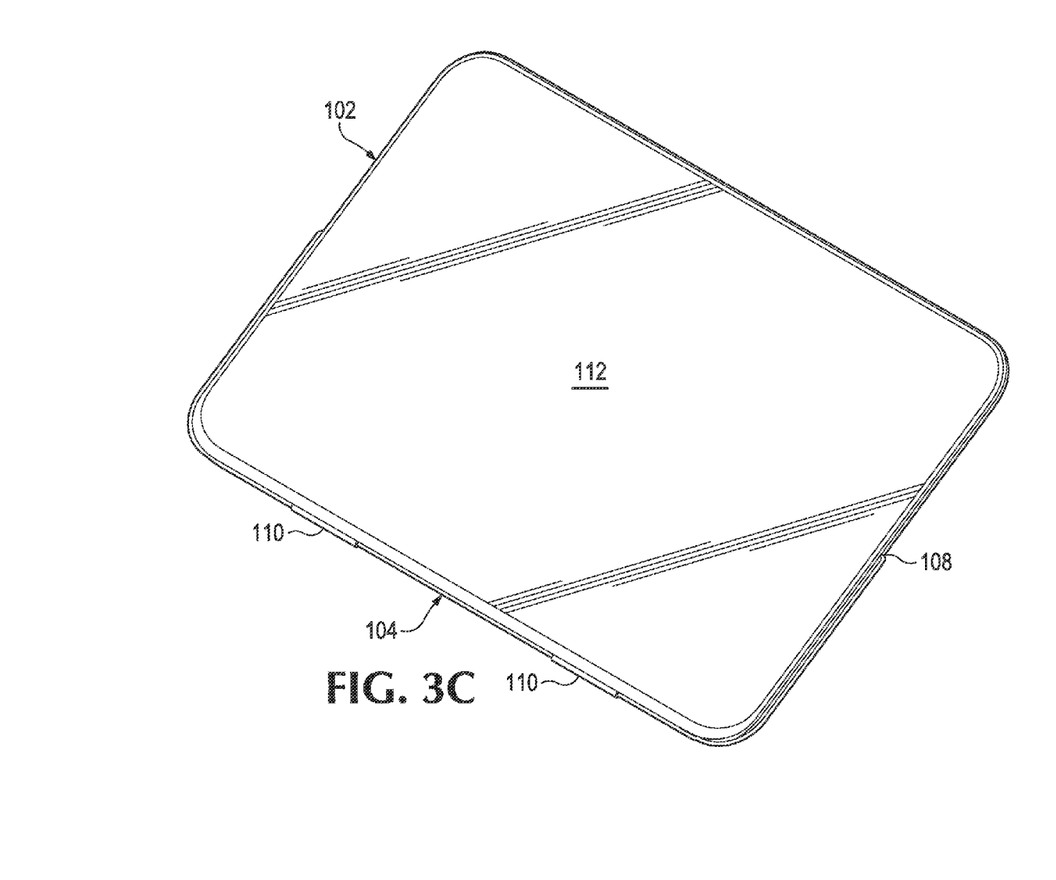
Figure 3D:
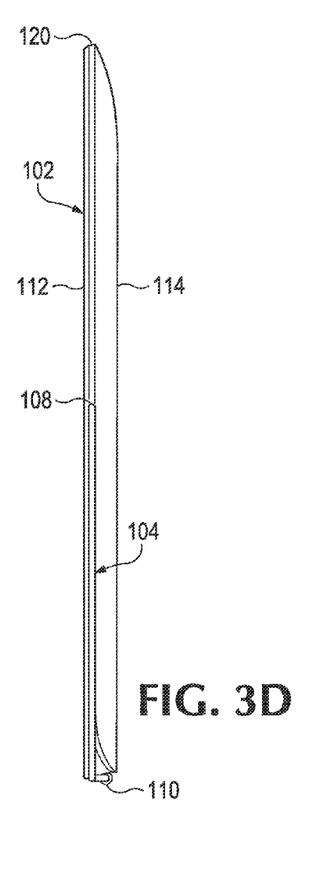

By being rotatably connected at 108 on the sidewalls 116 of the device 102, the portion of the perimeter of the device 102 the kickstand 104 may occupy includes a portion of the sidewalls 116 and the bottom wall 118, as illustrated in FIG. 3D. In addition, the kickstand 104 may be rotated 180 degrees from the position illustrated in FIG. 3D, and occupy another portion of the sidewalls 116 and the top wall 120 when retracted. As mentioned above, in order to rotate the kickstand 104 around the back surface 114 from the bottom wall 118 to the top wall 120, the kickstand 104 may connected at a midpoint on the sidewalls 116. By occupying a portion of the sidewalls and a bottom or top wall of the device 102, the back surface 114 of the device may remain exposed and the kickstand 104 may not add to the thickness of the device 102, which may be desirable for portable computing devices.

As an example, a wall of the device 102 (e.g., a wall of the display housing of a convertible laptop) may include slots (e.g., indentations) to house the non-skid elements 110 when retracting the kickstand 104. Referring to FIG. 3B, the bottom wall 118 (or top wall 120) of the device 102 may include slots 302 to house the non-skid elements 110 when retracting the kickstand 104. The slots 302 may ensure that the kickstand 104 remains retracted by securing the non-skid elements 110, as illustrated in FIG. 3A. The number of slots 302 may correspond to the number of non-skid elements 110 included on the kickstand 104. As an example, the device 102 may include single slot 302 to accommodate the non-skid elements 110. Referring to FIG. 3C, a user may be able to handle and view the display surface 112 of the device 102 with the kickstand 104 properly secured along a perimeter of the device 102.

Figures 4A, 4B:
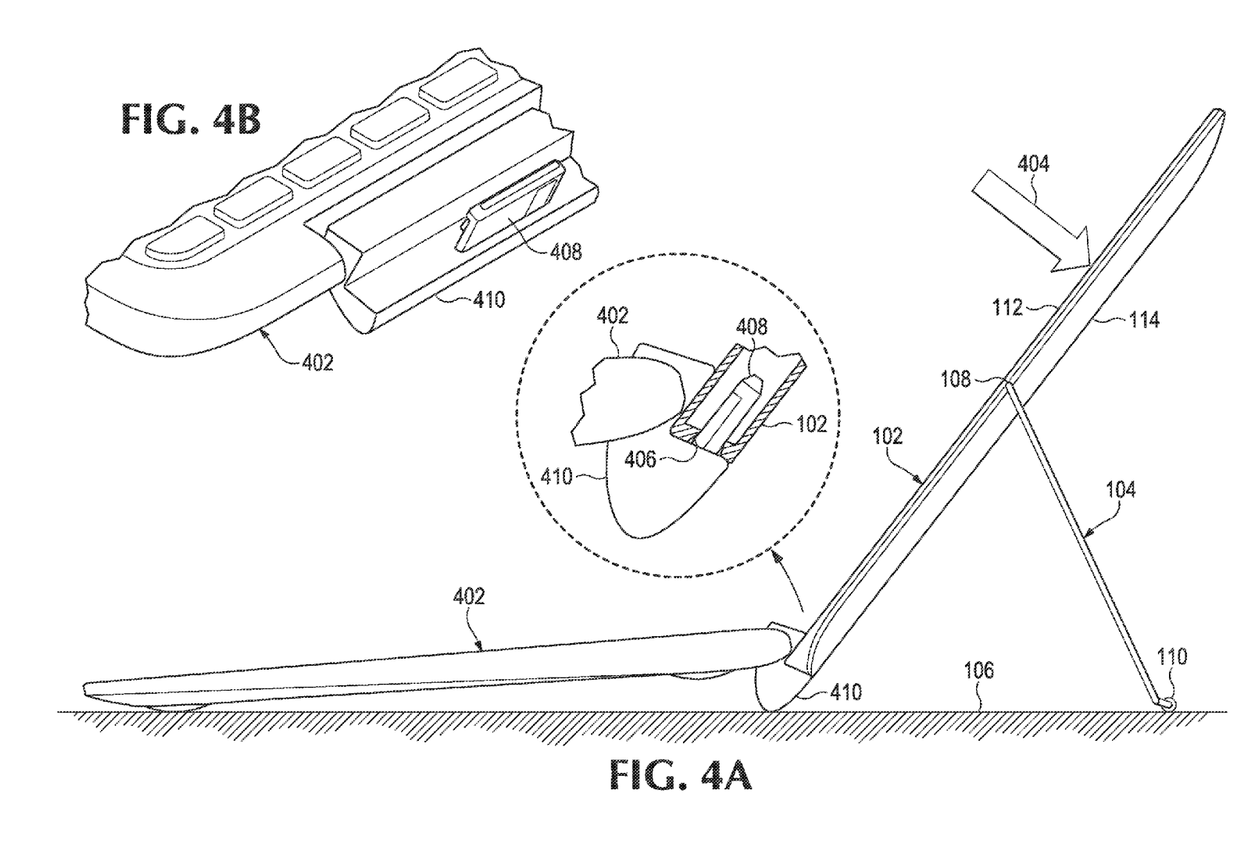
FIGS. 4A-B illustrate a convertible laptop that operated in laptop mode, according to an example.

FIG. 4A illustrates a convertible laptop that is operated in laptop mode with the portable computing device 102 (e.g., detachable display housing of the convertible laptop) mounted to a base housing 402, as an example. The base housing 402 may include an area for user input, such as a touchpad and keyboard. With the ability to operate the device 102 independently from the base housing 402 in tablet mode, a majority, if not all, of the internal components, such as electrical components, of the laptop may be assembled within the device 102. As a result, the detachable device 102 of a convertible laptop may weigh more than the base housing 402.

As an example, when a user operates the convertible laptop in laptop mode and interacts directly with the display surface 112 of the device 102 through simple or multi-touch gestures by touching the screen at 404, the kickstand 104 may prevent the convertible laptop from toppling backwards when the laptop is operated in laptop mode. Although the device 102 may weigh more than the base housing 402, the kickstand 104 may ensure a positive user experience.

Similar to the viewing angles illustrated in FIGS. 1A and 2, the non-skid elements 110 of the kickstand 104 may provide a level of frictional resistance between the elements 110 and the surface 106 that is sufficient to allow for the display surface 112 of the device 102 to be viewed at an angle that is appropriate for a user. In addition, the base housing 402 may include non-skid material (e.g., rubber feet) along a bottom surface of the base housing 402 that makes contact with the surface 106 to provide further frictional support for viewing the display surface 112 at an angle that is appropriate for a user.

The computing device 102 may be mountable to the base housing 402 via a rotatable hinge 410. As a result, the computing device 102 may be rotatably connected to the base housing 402 via the hinge 410. Referring to the enlarged sectional view in FIG. 4A, when mounting the computing device 102 to the base housing 402, the rotatable hinge 410 may include protrusions 408 to occupy respective cavities 406 within the bottom wall 118 of the computing device 102. By occupying the cavities 406 of the computing device 102, the protrusions 408 may secure the computing device 102 to the base housing 402. As an example, the computing device 102 may be magnetically coupled to the base housing 402 via the protrusions 408 and the cavities 406. In addition, the computing device 102 may be communicatively coupled to the base housing 402 via a conductive contact (not shown). FIG. 4B more clearly illustrates the protrusions 408 included on the rotatable hinge 410, as an example.

Referring back to FIG. 3B, the cavities 406 along the bottom wall 118 of the computing device 102 may occupy the same position of the slots 302 used to secure the non-skid elements 110 when the kickstand 104 is in a retracted position. As an example, when mounting the computing device 102 to the base housing 402, the protrusions 408 may push the non-skid elements 110 out from the slots 302. As illustrated in FIG. 4B, the protrusions 408 may be chamfered in order to aid in pushing the non-skid elements 110 out from the slots 302 as the computing device 102 is mounted to the base housing 402. Upon mounting the computing device 102 to the base housing 402, the user may then rotate the kickstand out to a position that is sufficient to allow for the display surface 112 of the device 102 to be viewed at an angle that is appropriate for the user (as shown, for example, in FIG. 4A).

Figures 5A, 5B, 5C:
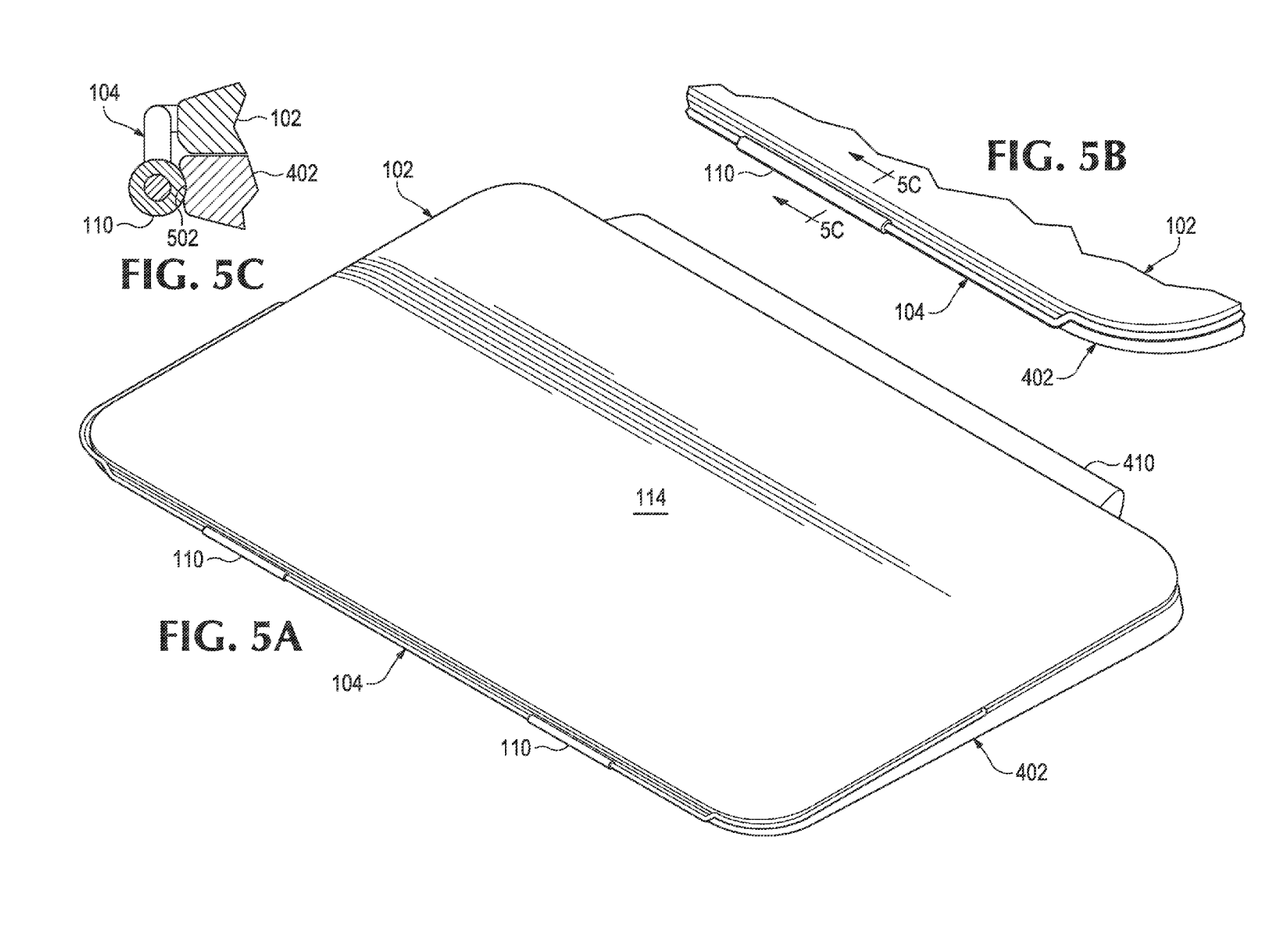
FIGS. 5A-C illustrate convertible laptop in a closed, folded position, according to an example.

FIG. 5A illustrates the convertible laptop in a closed, folded position, where the display surface 112 of the computing device 102 is rotated to cover a top surface of the base housing 402, as an example. In an effort to secure the convertible laptop in the closed, folded position, the kickstand 104 may be rotated around the back surface 114 of the computing device, and the non-skid elements 110 of the kickstand 104 may make frictional contact with a wall of the base housing 402 in order to secure the computing device 102 to the base housing 402, as illustrate. FIG. 5B illustrates a close-up view of the non-skid elements 110 of the kickstand 104 making contact with the wall of the base housing 402.

Referring to FIG. 5C, the wall of the base housing 402 may include slots 502 (e.g., indentations) to house the non-skid elements 110 when securing the computing device 102 to the base housing 402. The slots 502 may ensure that convertible laptop remains in the closed, folded position by securing the non-skid elements 110. The number of slots 502 may correspond to the number of non-skid elements 110 included on the kickstand 104. As an example, the base housing 402 may include a single slot 502 to accommodate the non-skid elements 110.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A portable computing device, comprising:
a display housing including a display surface and a back surface opposite the display surface, wherein a perimeter of the display housing comprises two sidewalls, a bottom wall, and a top wall;
a kickstand rotatably connected to the display housing on the two sidewalls of the display housing, wherein the kickstand comprises non-skid elements to frictionally support the display housing on a surface in a plurality of viewing angles, and wherein the display housing comprises slots on the bottom wall of the display housing to house the non-skid elements when the kickstand is retracted; and
a base housing mountable to the display housing, via a rotatable hinge wherein the hinge comprises protrusions to occupy cavities within the bottom wall of the display housing when mounting the display housing to the base housing.

2. The portable computing device of claim 1, wherein the kickstand is to occupy a portion of the perimeter of the display housing when the kickstand is retracted.

3. The portable computing device of claim 1, wherein the protrusions push the non-skid elements out from the slots when mounting the display housing to the base housing.

4. The portable computing device of claim 1, wherein a wall of the base housing comprises slots to house the non-skid elements of the kickstand to secure the display housing to the base housing when the display surface of the display housing is rotated to cover a top surface of the base housing.

5. A portable computing device, comprising:
a display housing including a display surface and a back surface opposite the display surface;
a kickstand rotatably connected to the display housing on two sidewalls of the display housing, wherein the kickstand comprises non-skid elements to frictionally support the display housing on a surface in a plurality of viewing angles; and
a base housing to which the display housing is rotatably connected, wherein a wall of the base housing comprises slots to house the non-skid elements of the kickstand to secure the display housing to the base housing when the display surface of the display housing is rotated to cover a top surface of the base housing.

6. The portable computing device of claim 5, wherein the display housing is detachable from the base housing to operate the display housing in a tablet mode.

7. The portable computing device of claim 6, wherein the display housing comprises slots along a bottom wall of the display housing to house the non-skid elements when the kickstand is retracted.

8. The portable computing device of claim 7, wherein the kickstand is to occupy a portion of a perimeter of the display housing when the kickstand is retracted.

9. A kickstand for a portable computing device, comprising:
- a rectangular frame rotatably connected to a display housing of the portable computing device on two sidewalls of the display housing, wherein the frame is to support the portable computing device in a plurality of viewing angles; and
- non-skid elements disposed along a length of the rectangular frame to frictionally support the portable computing on a surface in the plurality of viewing angles, wherein the non-skid elements are to occupy slots on a wall of a base housing rotatably connected to the display housing, to secure the display housing to the base housing when the display surface of the display housing is rotated to cover a top surface of the base housing.

10. The kickstand of claim 9, wherein the rectangular frame is to occupy a portion of a perimeter of the display housing of the portable computing device when the rectangular frame is retracted.

* * * * *

UNITED STATES PATENT AND TRADEMARK OFFICE
CERTIFICATE OF CORRECTION

PATENT NO. : 9,720,452 B2
APPLICATION NO. : 14/904612
DATED : August 1, 2017
INVENTOR(S) : Chien-Kuo Lee Page 1 of 1

It is certified that error appears in the above-identified patent and that said Letters Patent is hereby corrected as shown below:

In Column 6, Line 37, in Claim 1, delete "housing," and insert -- housing --, therefor.

In Column 6, Line 38, in Claim 1, delete "hinge" and insert -- hinge, --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*